(12) United States Patent
Benson (10) Patent No.: US 6,708,674 B2
(45) Date of Patent: Mar. 23, 2004

(54) PROPANE ASSIST CONVERTER AND REGULATOR

(76) Inventor: Steven R. Benson, 5919 S. 350 West, Murray, UT (US) 84107

( * ) Notice: Subject to any disclaimer, the term of this patent is extended or adjusted under 35 U.S.C. 154(b) by 1 day.

(21) Appl. No.: 10/012,109

(22) Filed: Dec. 11, 2001

(65) Prior Publication Data

US 2003/0106538 A1 Jun. 12, 2003

(51) Int. Cl.[7] .............................................. F02G 5/00
(52) U.S. Cl. ...................................... 123/557; 123/527
(58) Field of Search ................................ 123/557, 527, 123/27 GE; 62/48.2, 50.2, 50.4

(56) References Cited

U.S. PATENT DOCUMENTS

| | | | | |
|---|---|---|---|---|
| 4,434,774 A | * | 3/1984 | Horiuchi | 123/557 |
| 4,614,168 A | * | 9/1986 | Batchelor | 123/27 GE |
| 6,073,619 A | * | 6/2000 | Baranowski | 123/681 |
| 6,125,637 A | * | 10/2000 | Bingham et al. | 62/7 |
| 6,494,191 B2 | * | 12/2002 | Bingham et al. | 123/527 |

* cited by examiner

*Primary Examiner*—Mahmoud Gimie
(74) *Attorney, Agent, or Firm*—M. Reid Russell (57) ABSTRACT

The invention is in a regulator and converter operated to fumigate a volatile material, preferably a liquified petroleum gas (LPG), under vacuum, into an intake air flow of an internal combustion diesel engine to provide, on demand generated by an operator closing a throttle, passage of LPG to the regulator and converter wherein it is vaporized and the LPG vapors are passed into the engine intake air flow that travels into the engine. The injection of LPG vapors provides for an increase in engine output power and an improvement in fuel percentage of burn. The regulator and converter is connected the engine coolant system to receive a hot coolant flow, heating an LPG flow path therethrough to vaporize the LPG with the LPG vapors then directed from the regulator and converter into the engine intake air flow. With the control of LPG passage to the regulator and converter controlled by operation of an LPG cutoff valve that is operated responsive to a presence of a system as sense by high and/or low pressure switches.

15 Claims, 6 Drawing Sheets

PROPANE ASSIST CONVERTER AND REGULATOR

BACKGROUND OF THE INVENTION

1. Field of the Invention

This invention relates to demand type devices that are operated to fumigate a volatile material, under vacuum, into an intake air flow of a conventional engine to increase fuel burn efficiency and to boost power, and in particular, to devices for fumigation of liquified petroleum gas (LPG) into the engine intake air supply of an inlet of a turbo charged diesel engine.

2. Prior Art

Boost systems that function to fumigate a combustible gaseous or vaporous fuel into an engine, to mix with the engine air, for combustion within the engine cylinders, and provide a power boost have been employed for many years, with such applications, however, have generally been limited to gasoline type engines. Where, like the present invention, systems for the fumigation of liquified petroleum gas (LPG), and in particular propane gas, into, the intake air supply for combustion in a gasoline engine, rather than in a diesel engine like that of the invention. Such earlier systems have maintained the LPG or propane source in a gaseous state and have passed that gas directly into a fuel flow directed into engine cylinder firing chambers. Whereas, the invention provides for maintaining the LPG source in a liquid state and provides for a LPG vaporization with a utilization of engine heat, presenting an active LPG flow into the air supply that thoroughly mixes with the diesel engine fuel flow, to greatly improve the burn efficiency of the engine fuel.

Novel to the invention, the system of the invention operates under a vacuum to provide for an instant flow of vaporized LPG, on demand, and, requires less than one second for line purging after an operator lifts his foot off from the accelerator and manifold pressure drop, turning off the valve as commanded by pressure switches. With, for the invention to operate, the engine must be running and a minimum of point five (0.5) inches of water column vacuum must be present. In operation, when line pressure falls to three and one half (3 ½) psi, the LPG flow will be shut off, cutting off boost.

SUMMARY OF THE INVENTION

It is a principal object of the present invention to provide a liquified petroleum gas (LPG) into an assist convertor and regulator in a fumigation process operated under vacuum, supplying vaporized LPG into an intake air supply of a combustion engine, preferably a diesel engine, for mixing and burning with engine fuel to provide a power boost and a more efficient fuel burning.

Another object of the present invention is to provide a fumigation system that includes a converter cutoff valve that controls flow of a liquified LPG feed into the converter and regulator that, in turn, is passed into the intake air supplied to the engine, that is operated under vacuum of between minimum and maximum pressures, providing for opening, at a lesser vacuum, and with closure taking place at a greater vacuum.

Another object of the present invention is to provide an LPG fumigation system as an assist converter and regulator that will afford a vehicle operator with a rapid response when boost is initiated and will immediately shut off when the operator relaxes pressure on the engine throttle.

Another object of the present invention is to provide an LPG fumigation system as an assist converter and regulator system having a housing that is ported to pass coolant from the engine cooling system for heating an LPG passage therethrough to vaporize the LPG and fed it, on demand, into the engine intake air supply, providing a power boost when burned with the engine fuel.

Still another object of the present invention is to provide an inlet valve for an LPG fumigations assist converter and regulator that includes a valve body and seat arrangement where the respective contacting surfaces slope at slightly different angles as an interference fit, to provide positive valve closure.

Still another object of the present invention is to provide a housing for a converter and regulator that is manufactured in sections by machining solid aluminum billets, avoiding porosity in the housing interior as is common with cast housings, and the housing sections are arranged for convenient connection together.

Still another object of the present invention is to provide an LPG fumigation assist converter and regulator housing that is ported internally to pass a hot water flow from the engine cooling system for vaporizing LPG that is drawn through a separate housing, under vacuum, to flow into and mix with an engine inlet air supply of, preferably, an engine turbo charger, with the combined flows to pass into the engine for mixing with fuel for combustion in an engine combustion chamber, providing an efficient fuel burn and power boost.

In accordance with the above objects the present invention is in a liquified petroleum gas (LPG) fumigation system of an assist converter and regulator that includes a housing that is ported to internally pass a hot engine coolant flow, heating the housing interior. A pair of serpentine like passages are formed between LPG inlet and outlet ports that are separated from the engine coolant flow and receive a flow of LPG, in liquid form, on demand, from an LPG tank, with the heat transfer from the housing walls to vaporize the LPG flow. The LPG vapors are pulled by a vacuum into, so as to mix with an engine intake air supply flow, and the mixed air and LPG flows are then directed into an engine intake air inlet. Which engine intake air inlet is preferably an intake air supply inlet to a turbo charger of a diesel engine, with the mixed flows to pass into the engine and mix in the engine combustion chambers with engine fuel, for combustion. In practice, for operating the system, the engine must be running at a high enough RPM to create a slight vacuum in the intake air flow that is provided by air passing over a venturi that is located in the intake air line before that air flow enters the engine, with, for a turbo charged engine, manifold pressure or boost must be present at a predetermined volume in the flow prior to its entering the intake of a turbine compressor.

So arranged, with the presence of LPG in the intake air flow, the burn efficiency of the combustion of fuel in the engine is markedly improved to from ninety three (93) to ninety five (95) percent from a normal burn efficiency of from seventy five (75) to seventy eight (78) percent.

The LPG converter and regulator housing is preferably manufactured from solid aluminum billets by machining methods for arrangement together, providing smooth un-pitted surfaces, including the surfaces of interior passages. The LPG converter and regulator includes a LPG inlet valve that has a valve body and seat and is operated under vacuum, and includes contacting surfaces that are formed at slightly different slope angles at their points of contact, providing an interference fit, to effect a positive and immediate valve closure, limiting leakage, when the LPG flow is cut off. At cut off of LPG flow is provided by an LPG lockoff valve that is opened electrically through a pressure switch on a turbo charged engine, or by a micro switch on a naturally aspirated engine. The flow, as is controlled by the respective pressure or micro switch provides, in a separate line, a vacuum that is created by the passage of the flow across a venturi that moves a diaphragm that is maintained within the converter and regulator housing that flexes and closes off the LPG inlet valve, providing for a rapid line purge.

The LPG cutoff valve is normally open and closes at a manifold at the turbine manifold upon sensing, by individual high and low pressure sensors, pressures of approximately three (3) psi to fifteen (15) psi and may also be opened with a micro switch that is operated upon sensing of engine accelerator peddle travel. In operation, when that manifold pressure falls to below the three (3) psi or upon a sensing of a high pressure of approximately fifteen (15) psi and greater, the LPG cutoff valve is closed. In practice, a line purge occurs in less than one (1) second after an operator removes their foot off of the accelerator, providing a line vacuum that pulls all vaporized LPG from the housing that then travels into the air inlet flow. The rapid and positive LPG flow shut off through the LPG cutoff valve can, accordingly, be controlled by the high and low pressure switches, though, it should be understood, a single pressure switch, or by the use of a micro switch sensing engine acceleration as a function of accelerator peddle depression. Further, LPG outlet and the cutoff diaphragms are provided that are each individually fitted to seal against machined edges of the housing faces, that, when lifted out of engagement with which housing faces edges, provide for rapid LPG purging.

THE DRAWINGS

The following drawings illustrate that which is presently regarded as the best mode for carrying out the invention.

DETAILED DESCRIPTION

Figure 1:
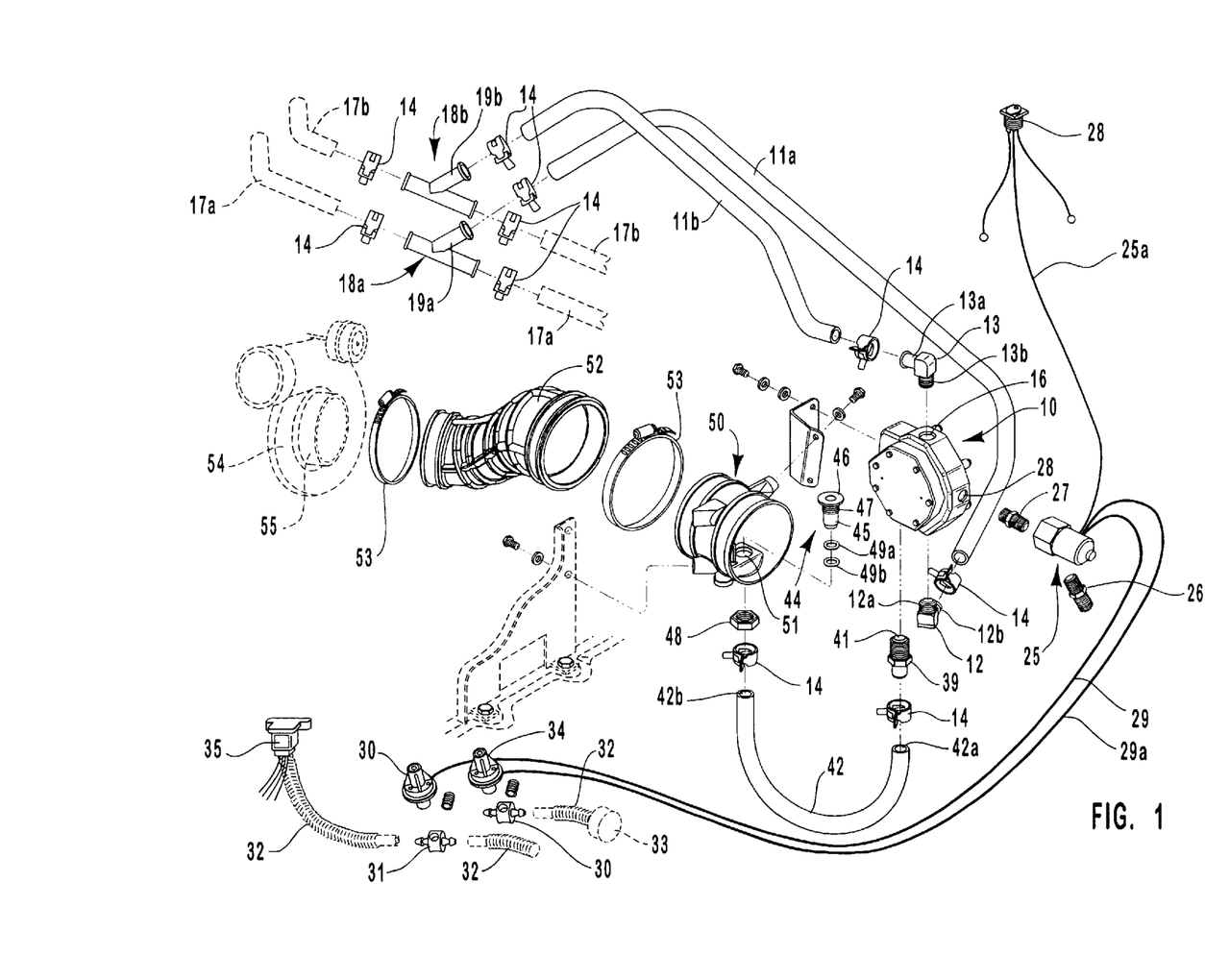
FIG. 1 shows an exploded view of an liquified petroleum gas (LPG) assist converter and regulator as a fumigation system along with related components for mounting to an engine to pass, on demand, LPG, as a vapor into an intake air supply to a diesel engine turbo charger.

The present invention in a liquified petroleum gas (LPG) assist converter and regulator system 10, hereinafter referred to as converter and regulator 10, that provides for the fumigation of a volatile material, under vacuum pressure, that is passed into an intake air flow to an internal combustion engine, preferably a turbo charged diesel engine. Shown in FIGS. 2 through 5B, the converter and regulator 10 is shown as a component for mounting in an engine compartment of a vehicle here illustrated as a turbo charged diesel engine. The converter and regulator 10, as set out in detail below, includes a center body 20 that is ported and chambered to pass both flows of liquified petroleum gas and coolant from the diesel engine cooling system, with the heated coolant for heating the center body 20 interior to vaporize the flow of a liquified petroleum gas passed therethrough. Engine inlet and return hoses 11a and 11b provide for moving the hot engine coolant and, respectively, have fittings 12 and 13 stem ends 12b and 13b telescoped into their ends that receive hose clamps 14 secured therearound after threaded ends 12a and 13a of inlet and return hosed have been turned into threads of coolant ports 15 and 16, respectively, of the center body 20. The hoses 11a and 11b are for, respectively, conveying a hot engine coolant flow through inlet hose 11a, with that flow, after passage through the converter and regulator 10, returned back to the engine coolant system through return hose 11b. As shown in FIG. 1, the out and in flows of coolant from and to the engine coolant system are provided through hoses 17a and 17b, respectively, that are shown cut and receive Y fittings 18a and 18b, respectively, that are fitted into the hoses 17a and 17b cut ends and are secured therein, also by hose clamps 14. Each Y fitting 18a and 18b is shown as having a sloping tube 19a and 19b that includes a collared end that is to receive ends, respectively, of the inlet and return hoses 11a and 11b fitted thereover, that are also secured by hose clamps 14. Heated engine coolant is transferred through the converter and regulator 10 for vaporizing the liquified petroleum gas (LPG), hereinafter referred to as LPG, as set out hereinbelow.

Figure 2:
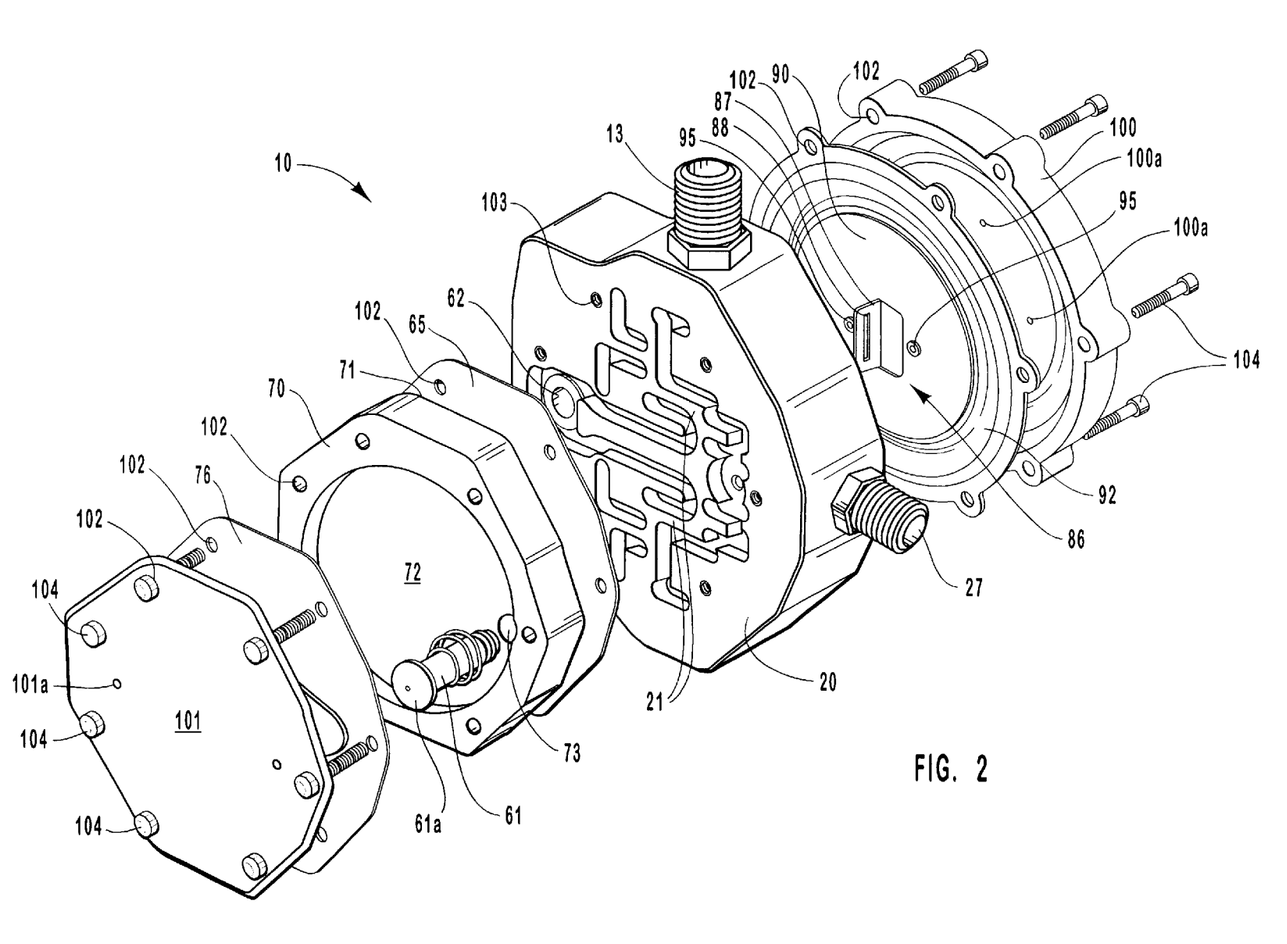
FIG. 2 shows an exploded perspective view taken from a left face of a housing of the LPG assist converter and regulator of the invention removed from the related and engine components of FIG. 1.
Figure 4:
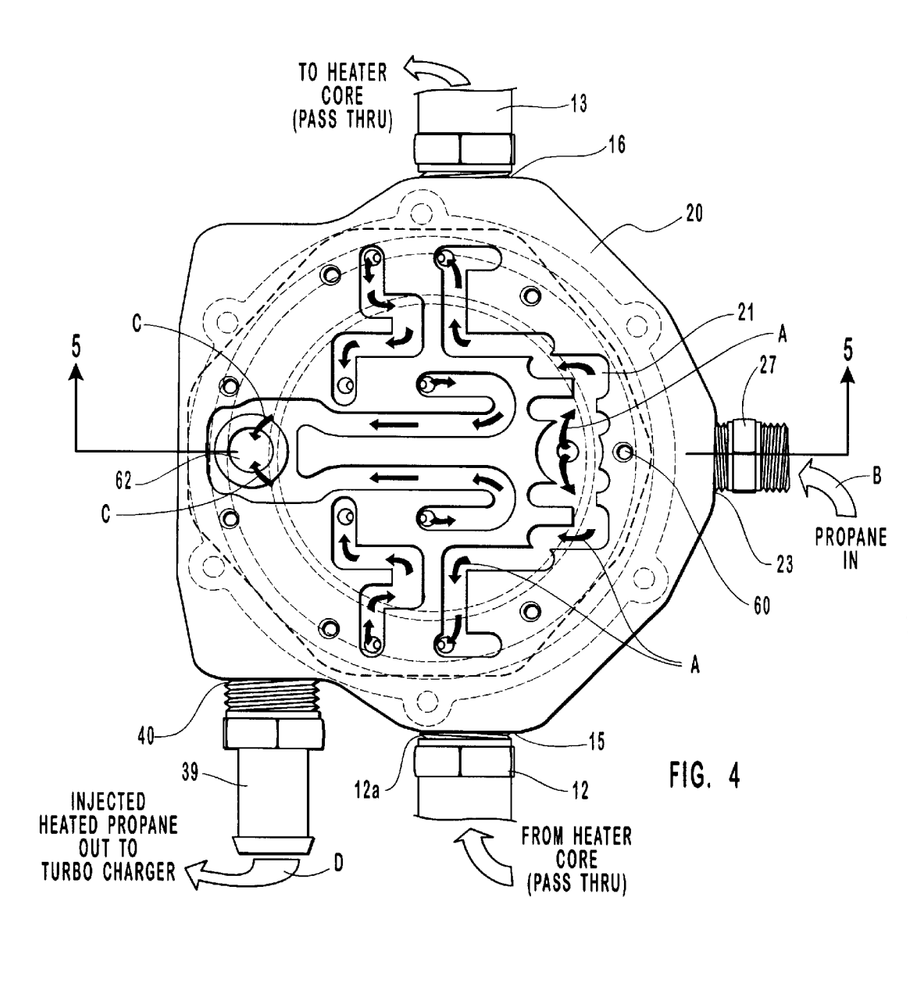
FIG. 4 is an end plan view of a center portion of the LPG assist converter and regulator housing of FIG. 2, that is shown as including small arrows that illustrate the flow paths of LPG as it enters in a liquid form and passes through the housing wherein the liquified gas is vaporized and flows from the converter and regulator from an LPG exhaust port, identified by arrow D, and travels to a turbo charger.
Figure 5A:
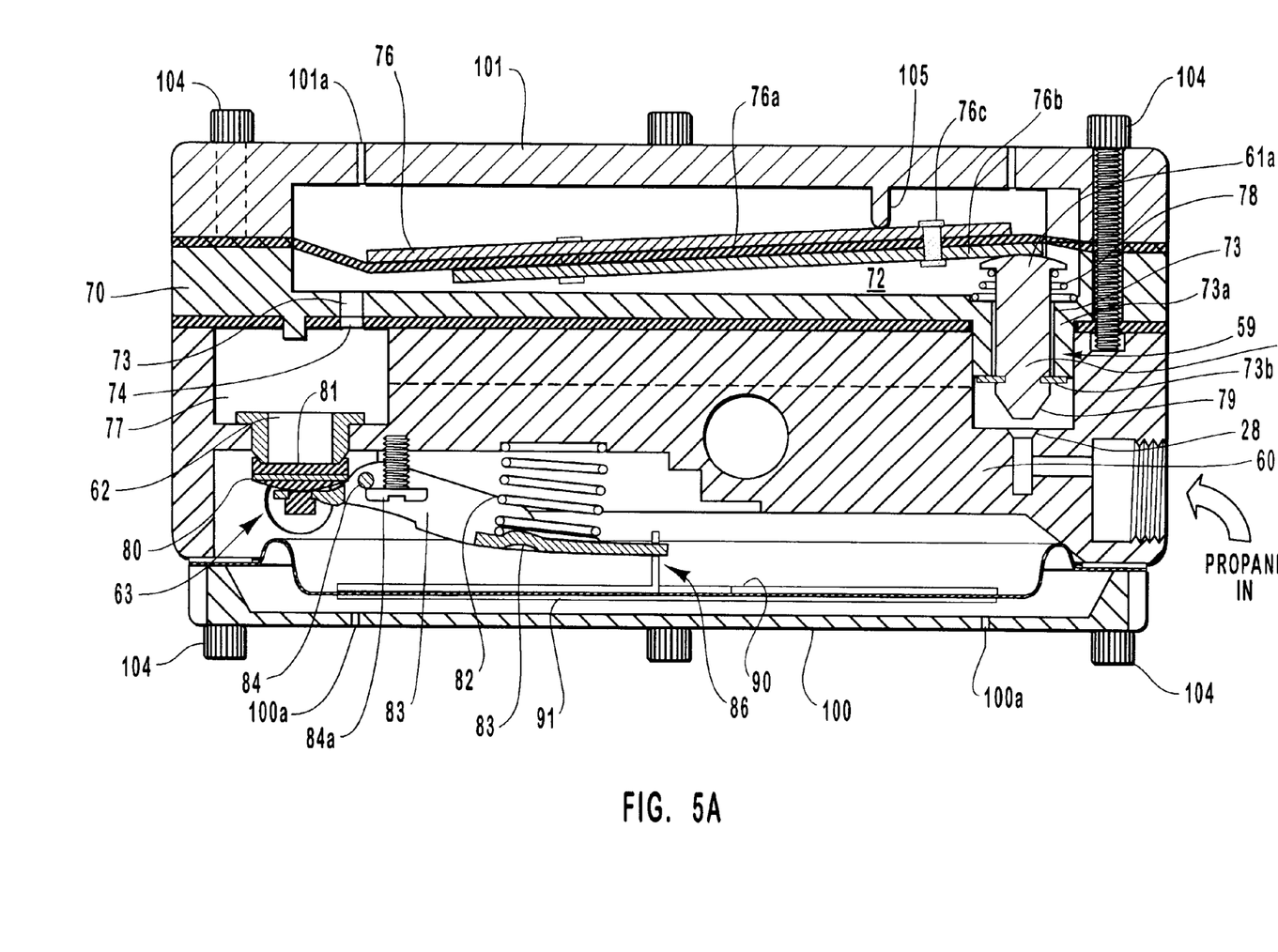
FIG. 5A is an end elevation sectional view taken along the line 5—5 of FIG. 4 of the housing interior showing the LPG inlet valve as being open and the LPG exhaust port as closed.
Figure 5B:
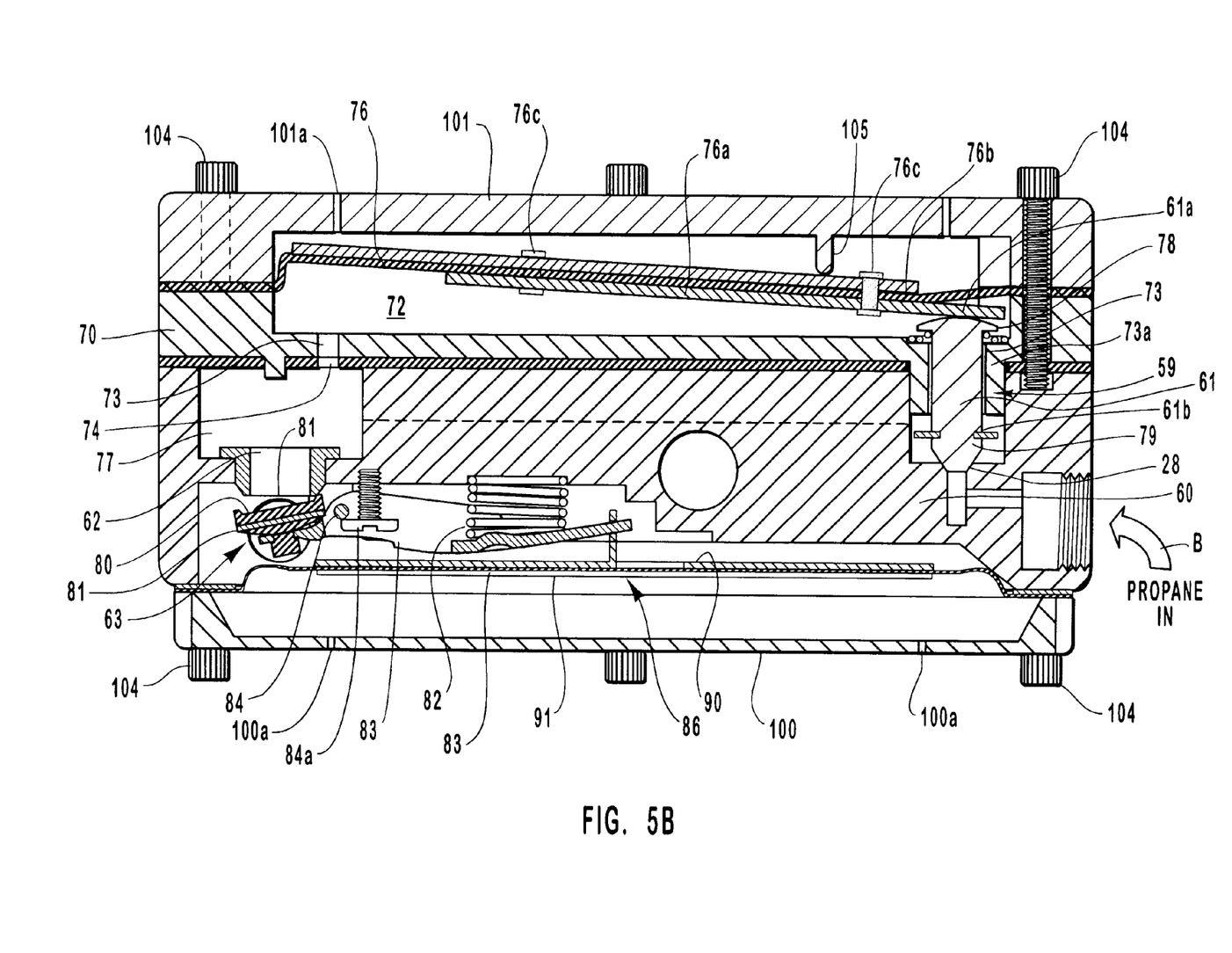
FIG. 5B is a view like that of FIG. 5A only showing the LPG inlet valve in a closed attitude and showing the LPG exhaust port in an open attitude.

FIG. 2 shows the LPG assist converter and regulator 10 exploded apart, with the center body 20 shown as including a pair of like interconnecting grooves 21, that as shown also in FIG. 4 with arrows A, pass an LPG flow through the center body portion wherein the entering LPG, that is preferably propane, is heated and converted into vapors. As shown in FIGS. 4, 5A and 5B, the LPG flow, hereinafter referred to as propane flow, enters through a fitting 27 that is turned into a LPG inlet port 23 that is formed in the center body portion. The LPG flow, shown as arrow B, enters in a liquid state from a LPG source that, in practice, is preferably a tank, not shown, wherein the LPG is maintained, under pressure. The flow from which LPG tank, not shown, enters a LPG lockoff valve 25, shown in FIG. 1, through a fitting 26 that connects to an end of a hose, not shown, that is, in turn, connected to pass LPG from the LPG tank. The LPG lockoff valve 25 is electrically connected through a line 25a to a push button type switch 28 that is mounted to, or in, a vehicle dash board, for operation by the vehicle operator.

Operation of switch 28 enables the opening of the LPG lockoff valve 25 to pass liquified gas therethrough. The LPG lockoff valve 25, after depression of the push button type switch 28, is operated by a either a signal from low pressure switch 30, that is connected through an electrical cable 29, or a high pressure switch 34, that is connected through an electrical cable 29a. The respective low and high pressure switches 30 and 34 are preferably Hobbs type pressure switches that each provide for sensing line pressure, and each includes and is mounted to, a pressure switch manifold 31 and 31a, respectively. The pressure switch manifolds 31 and 31a, respectively, are, in turn, each fitted into a tube 32a that connects between a manifold pressure sensor 35 and a coupling into a pressure chamber 33 that is shown as having been broken away from an engine turbo charger 55, that is shown in broken lines in FIG. 1.

Operation of the vehicle throttle provides a change in vacuum in tube 32 that is, in turn, sensed by pressure switches 30 and 34. In practice, for operating the system, the engine must be running at a high enough engine RPM to create a sufficient vacuum in the intake air track to operate the low pressure switch 30. Which vacuum is provided by a passage of air over a venturi. With, for turbo charged engines, as the invention is for use with, manifold pressure or boost must be present at a required volume, in addition to the vacuum created by air passage over the venturi 44. Which vacuum, to initiate LPG flow, is created by the intake air passing over venture 44 located in the intake air track that enters the engine turbo charger, as shown in FIG. 1. A sensing of a vacuum of approximately point five (0.5) inches of water column vacuum causes operation of the low press switch 30, with the high pressure switch 34 set to operate at approximately thirty (30) inches of water comumn vacuum, and greater. With the required minimum pressure sensed at pressure switch 30 a command is passed through cable 29 to the LPG lockoff valve 25 to cut off LPG flow. Likewise, a sensing of the high vacuum pressure at the high pressure switch 34 a command is passed through cable 29a to LPG lockoff valve 25 to close off LPG flow. Accordingly, it should be understood, the system of the invention is vacuum operated and a sensing of a minimum vacuum pressure of point five (0.5) inches of water column vacuum and sensing of a high vacuum of approximately thirty (30) inches of water column vacuum results in the operation of pressure switches 30 and 34, respectively, that command LPG lockoff valve 25 to open. The flow of gaseous LPG through the converter and regulator 10 of the invention is continued so long as the high and low pressure switches 30 and 34, respectively, do not command the closure of the LPG lockoff valve 25, with LPG allowed to continue to be drawn under vacuum through the converter and regulator 10. With, of course, the pressure switch es 30 and 34 are preferably adjustable to set desired vacuum pressure limits, as required. Additionally, while the pair of high and low pressure switches 30 and 34, respectively, are shown herein as preferred, it should be understood that a single pressure switch could be so used within the scope of this disclosure. In practice, a very rapid response is provided through the low and high pressure switches 30 and 34 that control shut off of the LPG lockoff valve 25, to cut off of the LPG flow in less than one (1) second after an operator takes their foot off the vehicle accelerator, providing, thereby, a rapid system purge.

With the LPG lockoff valve 25 open, a flow of LPG enters the converter and regulator 10 and is immediately vaporized and passes through an LPG flow valve 59, that is shown best in FIGS. 3, 5A and 5B, and whose function and structure will be described in detail later herein. The LPG flow valve 59 operates in response to the opening of the LPG lockoff valve 25 that is operated in response to the presence of a vacuum at an outlet port 40, shown in FIG. 4, wherein a fitting 39 is turned that connects to pass the LPG flow therethrough. The fitting 39 includes a center orifice 41 whose diameter is selected to provide a desired flow volume output. This flow passes through a hose 42 that has an end 42a that is fitted over a flanged end and onto a fitting body 39a. A clamp 14 is fitted and clamped thereover, and with the other hose 42 end 42b is fitted over a smooth body portion 45 of a LPG venturi 44 that also receives a clamp 14 fitted and secured thereover.

The LPG venturi 44 can be formed in any convenient shape or sizes to produce an appropriate vacuum but is shown herein as including a flat disk top or crown 46 having a smooth undersurface and is threaded at 47, at the top of the body portion 45, to receive a nut 48 turned thereover, which nut 48 is turned onto the body portion 45 after it has been fitted through a port 51 that is formed into a turbine air cleaner duct 50. LPG injection O-rings 49a and 49b are fitted onto the body portion 45, and are compressed between the flat disk top or crown 46 undersurface and the port 51 edge, to prohibit gas leakage along the LPG venture 44 body portion 45. So arranged, the top surface of the LPG venture top or crown 46 is parallel to an air flow path that is drawn through the turbine air cleaner duct 50. Thereby a passing air flow will draw air from the LPG venture 44, creating a vacuum therein and in the connected hose 42 that is fitted into the converter and regulator 10. The vacuum pulls, as set out in detail hereinbelow, a flow of LPG gas from flap valve 63 that is opened by the vacuum as is generated in the venturi. The vacuum both opens the flap valve 63 and urges outward travel of an LPG outlet diaphragm 92, as shown in FIGS. 5A and 5B, with LPG to thereby pass across the flap valve 63, traveling out of fitting 39 and through hose 42, and is injected through the LPG venture 44 into the air flow through the air cleaner duct 50.

The air flow, as shown in the drawings, is pulled by operation of a diesel engine turbo charger 54, as shown in broken lines, to pass across the LPG venture 44, pulling a vacuum in the hose 42 to draw LPG therethrough, for mixing with the engine intake air flow. The combined flows then travel from the air cleaner duct 50, through a turbine inlet hose 52, and into the turbo charger 54. Though, it should be understood, the invention can be included on other than turbo charged engines, within the scope of this disclosure. For the turbo charged engine shown, to contain the air flow, the ends of the turbine inlet hose 52 are connected by hose clamps 53 onto, respectively, an outlet side of the air cleaner duct 50 and a mounting collar 55, that is shown in broken lines, of the turbo charger 54. So arranged, the mixture of LPG and air, as is pulled through the turbo charger, mixes in the engine with fuel and is ignited in the engine combustion chambers.

The converter and regulator 10, as shown in FIGS. 2 through 5B, is preferably formed in sections to have the shape shown, but can be any convenient shape for fitting into space as is available, within the scope of this disclosure. The sections, as shown, are coupled together and include the center body portion 20, wherein the interconnecting grooves 21 are formed to provide the pair of serpentining tracks wherethrough LPG is directed. The LPG enters the center body portion 20 through the LPG cutoff valve 25 and passes through fitting 27 into a seat 60 of the LPG inlet valve 59. Which LPG inlet valve 59 includes an LPG inlet valve body 61. The LPG flow splits at the seat 60 and travels through the two separate paths that are formed by the interconnecting grooves 21 that are both open at LPG exhaust port 62. Which LPG exhaust port includes the LPG flow valve 59 that is vacuum operated to open and close by operation of a flap valve 63. The functioning and interaction of which LPG flow valve 59 and exhaust port 62 flap valve 63 will be described in detail hereinbelow.

In operation, when an LPG flow is passed from the LPG lockoff valve 25 into the converter and regulator 10, that entering flow travels along grooves 21 that, as shown in FIG. 2, are covered by a gasket 65 forming passages. So arranged, heating of the center body portion 20 by the passage of the heater core water flow through the converter and regulator center body portion, immediately vaporizes the LPG upon its entry. The LPG vapors are under a pressure that is greater than atmospheric pressure and, accordingly, rapidly expand, shown by arrows C, into the exhaust port 62 and are drawn, under vacuum, through the flap valve 63 that lifts off of the LPG exhaust port 62, against a spring biasing that is exerted by coil spring 64. The flap valve 63 is thereby opened to pass vaporized LPG into a cavity 66 that is formed in the face of the center body portion 20, opposite and parallel to the face wherein the interconnecting grooves 21 are formed. Flap valve 63 lifting is provided by the flexing of the LPG outlet diaphragm 92 to the attitude shown in FIG. 5B, responsive to the presence of a vacuum at fitting 39, as set out above.

The LPG gas travels from cavity 66 and into and through the LPG outlet port 40 and fitting 39, shown in FIG. 4, and passes through the hose 42 that is under a vacuum that is created at LPG venture 44. Which vacuum is created by the passage of an air flow through the air cleaner duct 50 that travels across the top of LPG venture 44 that mixes with the vaporized LPG, with that mix flowing into the turbo charger 54, as shown in FIG. 1.

Shown in the exploded view of FIG. 2, the converter and regulator 10 includes the center body portion 20 with the gasket 65 positioned over the body portion 20 face wherein the intersecting grooves 21 are formed. The gasket 65 is sandwiched between the body portion 20 and extends across the grooved face and a flat inner face 71 of an exhaust valve body section 70. Which exhaust valve body section 70 includes a center cavity 72 wherethrough a port 73 that contains the LPG inlet valve body 61 is fitted and with the exhaust valve body section 70 to travel up and down in port 73, as shown in FIGS. 5A and 5B. Further, the exhaust valve body section 70 includes vent opening 74 that align with an opening 75 that is formed through the gasket 65. Which vent opening 74 and gasket opening 75 align to provide a flow passage into the space or cavity 72, below a cutoff diaphragm 76. The aligned vent opening 74 and gasket opening 75, as shown in FIGS. 5A and 5B, open into an exhaust cavity 77 of the body portion 20 wherein the LPG exhaust port 62 is located. The valve body 61, as shown in FIG. 5A, is spring biased by a coil spring 78, to an open attitude. So arranged, in a passage of an LPG flow, the lockoff valve 25 directs that flow through the seat 60 and into the interconnecting grooves 21, traveling therethrough into the exhaust cavity 77, and with that flow to act against an upper face 81 of a body 80 of the flap valve 63.

Figure 6:
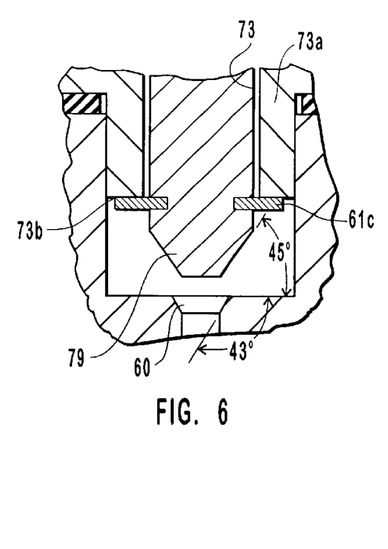
FIG. 6 is an enlarged sectional view taken within the like 6—6 of FIG. 5A showing the valve end of the LPG inlet valve body and seat, and showing the slope angles of the respective valve body end and seat, providing an interference fit therebetween.

The LPG inlet valve 59 includes the port 60 and LPG inlet valve body 61 that is biased by coil spring 78 to an open attitude, shown in FIG. 5A. The coil spring 78 is fitted between the undersurface of a flat head 61a of the LPG inlet valve body 61 and the edge of port 73 that is formed through center cavity 72 of the exhaust valve body section 70. A clip 61c, shown in FIGS. 5A, 5B and 6, is fitted to, to partially encircle, a lower portion of the LPG inlet valve body 61, to be positioned below an end 73b of a footing 73a wherethrough the port 72 is formed. So arranged, with the clip 61c installed in a groove formed around the LPG inlet valve body 61, the valve body is free to move up and down in the port 72, from the attitude shown in FIG. 5A, to that shown in FIG. 5B. The LPG inlet valve body 61 end 79, as shown best in FIG. 6, is preferably an inverted frustum cone having a slope of approximately forty five (45) degrees that will travel into to engage the port 60 wall that is sloped at approximately a forty three (43) degree angle, providing an interference fit therebetween, functioning as a valve seat.

For providing closure of the LPG inlet valve body 61 end 79 into the seat formed by the port 60 wall, a round top plate 76a and a triangular shaped plate 76b are provided that are positioned above and below a cut off diaphragm 76, creating a sandwich with the triangle apex aligned with the valve body head end 61a. Which sandwich is maintained by securing rivets 76c therethrough. Before LPG is passed from the LPG cutoff valve 25, and during LPG vapor flow, the LPG inlet valve 59 is in the attitude shown in FIG. 5A. Whereat, the cut off diaphragm 76 is flexed into the exhaust valve body section 70 cavity 72 and the round plate section is positioned above the triangle apex portion to engage a pivot post 105 that extends at a right angle from the undersurface of an end cap 101. When, upon sensing a high or low vacuum pressure at the low or high pressure switches 30 and/or 34, the LPG lockoff valve 25 is shut, closing off LPG flow into the regulator and converter 10. Thereupon residual LPG vapors as are present in the regulator and converter 10 pass through port 74 above the exhaust port 62 at a pressure greater than atmospheric and move the cut off diaphragm 76 to the attitude shown in FIG. 5B. So arranged, the disk 76a is lifted against the pivot post, cantilevering the triangle plate 76b apex end into engagement with, to press downwardly upon the head end 61a of the valve body 61, closing the LPG inlet valve 59. Thereafter, as pressure is removed from the flap valve 63, a coil spring 82 flexes outwardly, rotating the flap valve onto the seat 62, as shown in FIG. 5A.

Figure 3:
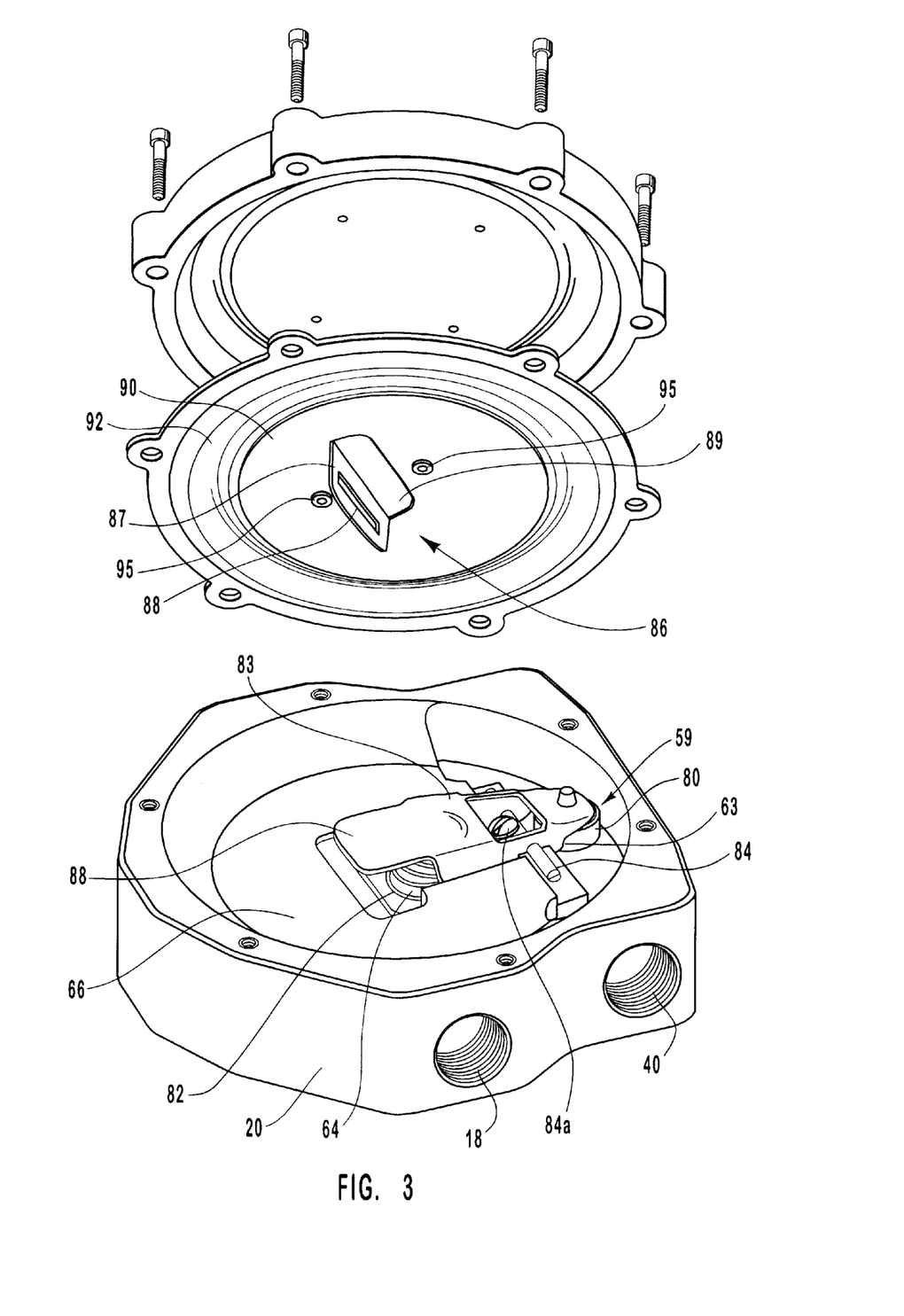
FIG. 3 shows an enlarged further exploded perspective view of the housing and one side of the LPG assist converter and regulator of FIG. 2.

The flap valve 63, shown in FIGS. 4, 5A and 5B, and in FIG. 5A, as normally closed with the coil spring 82 extending against an end of arm 83 that is pivotally mounted to a pin 84 that has been fitted through the arm 83, and is maintained to the center body portion 20 by a screw 84a, as shown in FIGS. 3, 5A and 5B. The coil spring 82, when extended, provides for a pivoting of the face 81 of body 80 into engagement with the end of the exhaust port 62. For providing lifting of the flap valve 63 to the attitude shown in FIG. 5B. As shown best in FIG. 4, a straight flat end section 85 of the arm 83 is arranged to fit into a slot 88 that is formed in a right angle section 87 of a diaphragm operated clip 86. The diaphragm operated clip includes a coupling section 89 that is mounted between inner and outer disks 90 and 91 where between is arranged a LPG outlet diaphragm 92, and with the right angle section 87 pinched therebetween. The sandwich of the respective LPG outlet diaphragm 92 between the inner and outer disks 90 and 91 is maintained, as shown best in FIGS. 2 and 3, by rivets 95 that are fitted therethrough, and with the ends of the rivets flanged over. In practice, the clip 86 moves the flap valve arm 83 responsive to movement of the LPG outlet diaphragm 92 between the attitudes shown in FIGS. 5A and 5B, as discussed hereinbelow.

FIGS. 5A and 5B show the LPG inlet valve 59 body 61 as separated from the valve seat 60. The LPG inlet valve body 61 is seated in the valve seat 60 when the flap valve 63 is operated. Which flap valve 63 is closed over the exhaust port 62 in FIG. 5A and is shown being lifted off the exhaust port 62 in FIG. 5B. FIG. 5A represents the attitude of which LPG inlet valve 59 and flap valve 63 prior to and at opening of the LPG lockoff valve 25, and with FIG. 5B showing the positioning of the LPG inlet valve 59 and flap valve 63 at LPG lockoff, when valve 25 is shut off. Whereat, the LPG vapors as remain in the center body portion 20 are rapidly vented. It should, however, be understood that, during LPG flow into and through the converter and regulator 10, the flap valve 63 is in the position shown in FIG. 5B. In which attitude, the LPG outlet diaphragm 92 is flexed inwardly, moving the diaphragm operated clip 86 to force the straight flat end section 85 thereof against the arm 83, compressing the coil spring 82, and pivoting the flap valve 63 end of the arm 83 downwardly. The flap valve 63 end of arm 83 is thereby pivoted around pin 84, moving the flap valve face 81 off of the exhaust port 62. Accordingly, during LPG conversion from a liquid to a vapor state, and during passage of the vapors through the converter and regulator 10, both the LPG inlet valve 59 and flap valve 63 are open.

The converter and regulator 10, shown best in FIG. 2 and as set out above, is a sandwich and includes end caps 100 and 101 that are fitted over the respective LPG outlet diaphragm 92 and cutoff diaphragm 76. These components, as shown, include spaced holes formed therethrough that align with one another and with threaded holes 103 that are formed in the center body portion that are to receive screws 104 fitted therethrough that are turned into the threaded holes 103, coupling the components together. Which end caps each include holes 100*a* and 101*a*, respectively, that open the areas under which end caps to atmosphere.

In practice, a sensing of the presence of a vacuum in hose 32, at either low or high pressure switches 30 and 34, commands operation of the LPG lockoff valve 25 to either pass or cut off flow of LPG into the converter and regulator 10 of the invention. That LPG is vaporized in the converter and regulator, with the LPG vapors expanding and flowing through the intersecting passage grooves 21 that are formed through the center body portion 20. Which center body portion 20, the exhaust valve body section 70 and end caps 100 and 101 are all preferably formed by machining billets of aluminum, that is preferably a 6061 aluminum. Which machining provides a finished unit with un-pitted surfaces. As set out above, the respective LPG outlet and cutoff diaphragms 76 and 92 provide for LPG cutoff valve 25 closure, shutting off the flow of vaporized LPG, and provide a rapid line purge that occurs within approximately one second from LPG cutoff valve 25 operation. In operation, the low and high pressure switches 30 and 34 individually control operation of the LPG cutoff valve 25 to as to operate the system at from two to four inches of water column vacuum, while the low pressure switch 30 is preferably set to direct shut off of the LPG cutoff valve 25, at a minimum vacuum of point five (0.5) inches of water column vacuum, and with the high pressure switch 34 set to direct shut off of the LPG cutoff valve 25 upon a sensing of thirty (30) inches of water colum vacuum and greater. Also, the pressure switches 30 and 34, are arranged to limit LPG lockoff valve opening to only when the engine is running,. So arranged, where a percentage of diesel fuel as is burned in the engine is usually from seventy five to seventy eight percent, with operation of the regulator and converter 10, and associated components, as has been described herein, the diesel fuel burn percentage is raised to from ninety three to ninety five percent.

While a preferred embodiment of my invention in a converter and regulator 10 has been shown and described herein, it should be understood that the present disclosure is made by way of example only and the invention can be reconfigured and the described components rearranged, within the scope of this disclosure, and additionally, that the invention is suitable for uses additional to those described, within the scope of this disclosure, and that variations and changes to the invention and the components thereof are possible without departing from the subject matter coming within the scope of the following claims, and a reasonable equivalency thereof, which claims I regard as my invention.

I claim:

1. A regulator and converter for fumigating a volatile material, under vacuum, into an internal combustion engine air intake flow comprising, a body that includes a center portion, an exhaust valve section, and end caps arranged to fit over outer surfaces of, respectively said center portion and said exhaust valve section, and including means for connecting said center portion, exhaust valve section and end caps together with said body including ports formed into a cavity in said center portion that includes means for mounting inlet and outlet hose means into said ports for passing engine coolant therethough heating said body, and which said center portion cavity is ported at separated outer surfaces and includes fittings in each of said ports for connection to the inlet and outlet hoses, respectively, that pass the flow of engine coolant therethrough; and the LPG passage is a pair of grooves that are formed across a face of said center portion and, in the assembly of the body, said pair of grooves are covered over by a flexible rubber gasket that is sandwiched between said center portion grooved face and a flat face of the exhaust valve section, and a source of liquid LPG that is vaporized in passage through at least one LPG passage that is separate from said cavity and is formed between an LPG port and an outlet port means into said body, with said flow traveling out of said outlet port means for passing vaporized LPG to a diesel engine air intake flow: and an LPG inlet valve means located in said body to close off LPG flow: means for operating said LPG inlet valve means to shut off LPG flow through said body upon operation of an LPG cutoff valve means to open in the presence of a vacuum in the engine inlet air flow of a pressure of approximately point five (0.5) inches of water column vacuum and to close at a pressure of approximately thirty (30) inches of water column vacuum and greater for controlling flow into said body.

2. The regulator and converter as recited in claim 1, wherein the body center portion, exhaust valve section and end caps are manufactured by machining methods from separate aluminum billets.

3. The regulator and converter as recited in claim 1, wherein the center portion includes the LPG inlet port and the vaporized LPG exhaust port that are formed into opposite sides thereof, with said LPG inlet port to include, as the LPG inlet valve means, a valve seat having a tapering surface to receive a tapered surface of a valve body, providing an interference fit therebetween where the slope of the valve body taper is slightly greater than the slope of the valve seat tapering surface, and which said valve body is fitted through, to slide up and down in, a hole formed through the exhaust valve section and including means for biasing said valve body away from said valve seat; and a diaphragm, as the means for moving said valve body tapered end, into said valve seat, which said diaphragm is maintained across a cavity formed in an outer surface of said exhaust valve section and has a pusher portion that is located adjacent to a head end of said valve body and which said pusher portion is to engage and depress said valve body head end, against said biasing means, urging said valve body sloping surface into said valve seat when the pressure is greater in the area between diaphragm and the valve body head than in the area above said diaphragm.

4. The regulator and converter as recited in claim 1, wherein the slope of the valve body tapered end is at a forty five degree angle and the slope of the taper of the valve seat that receives said valve body tapered end is at a forty three degree angle.

5. The regulator and conventer as recited in claim 1, wherein the port means for passing vaporized LPG to an engine intake air flow is a flap valve means that includes an arm that dis pivotally mounted onto the center portion, adjacent to the vaporized LPG exhaust port and includes a valve face for positioning over, to close off, said vaporized LPG exhaust port and spring means are fitted, to so as to act upon said arm, urging said valve face into engagement over said vaporized LPG exhaust port, blocking flow therethrough; and a diaphragm is mounted across said center portion, above said flap valve means, and beneath an end cap, that includes both a stiff metal tab formed with a foot for mounting onto said diaphragm surface and a section that is at a right angle thereto that includes a slot formed therethrough for fitting over an end of said arm, whereby, when LPG vapors are directed through said LPG exhaust port the pressure thereof lifts said flap valve face off of said LPG exhaust port and passes the LPG vapors therethrough, and when LPG flow is cut off, the spring biasing on said flap valve arm will move said flap valve face into engagement with, to close off, said LPG exhaust port, which said diaphragm flexes with travel of said arm and responsive to a vacuum at said LPG exhaust port, toward the arm, depressing that arm against the biasing of said spring means.

6. The regulator and converter as recited in claim, 1 wherein the means for enabling and controlling is the propane cutoff valve that includes a switch means for operation by an engine operator to enable valve operation; and at least one low or high vacuum pressure switch that are each electrically connected to said LPG cutoff valve and are individually to sense a vacuum as is pulled on opening or closure of an engine throttle, which said low and high pressure switches can each send a shutoff signal to said LPG cutoff valve when, respectively, the low pressure switch senses a lower than set water column vacuum, and when the high pressure switch senses a higher than set pressure, and either of which low or high pressure switches are capable of sending a closure signal to said LPG cutoff valve to close.

7. The regulator and converter as recited in claim 6, wherein the low pressure switch is set to pass a cutoff signal to the LPG cutoff valve upon sensing of approximately point five (0.5) inches of water column vacuum; and the high pressure switch is set to pass a cutoff signal to the cutoff valve upon sensing of approximately thirty (30) inches of water column vacuum.

8. A fumigation system for converting liquid petroleum gas (LPG) into vapors and passing the LPG vapors into an intake air line to a diesel engine comprising, a body means arranged for installation to an internal combustion diesel engine to pass, under vacuum, a fumigation flow of LPG vapors into an engine air intake flow and is to receive, through an LPG inlet valve means, liquified petroleum gas (LPG) and a source of heat to vaporize that LPG and pass it through an outlet port into an engine air inlet flow, with said LPG passing through said LPG inlet valve means into said body means on command of a sensor means that controls operation of an LPG cutoff valve that, when open passes a flow of LPG through said LPG inlet valve means into said body means and is operated responsive to operation of an engine throttle by a sending or the presence of a vacuum in a sensor line of approximately point five (0.5) inches of water column vacuum, and which said sensor means, upon a sensing; in said sensor line of the presence of a vacuum of approximately thirty (30) inches of water column vacuum or greater, and which said vacuum is produced in a venturi that is fitted in an end of said sensor line whereacross the engine air inlet flow passes; the body means is formed in sections arranged for coupling together and consists of a center portion, an exhaust vale section, and end caps that are arranged to fit over outer surfaces of, respectively, said center portion and exhaust valve section, and which said body outer portion, exhaust valve section and end caps include holes formed therein to receive fasteners for coupling together into said body means; which said center portion includes ports formed therein that open into a cavity that includes means for coupling inlet and outlet hoses into said ports to pass engine coolant therethrough, and including at least one passage formed in, to extend across, said center portion, between an LPG inlet port and a vaporized LPG exhaust port; an LPG inlet valve means that is normally open and is controlled by operation of said sensor means to open and shut off LPG flow upon opening and closure of said LPG cutoff valve, respectively; the sensor means for controlling closure of said LPG cutoff valve includes at least one low or high pressure vacuum switch, and with said low and high pressure vacuum switches to sense a vacuum generated by operation of said engine throttle; and an LPG outlet valve means maintained across said LPG outlet port that is normally closed, and is operated to open to pass LPG vapors therethrough.

9. The regulator and converter as recited in claim 8, wherein the body means center portion, exhaust valve body section and end caps are manufactured by machining methods from separate aluminum billets.

10. The regulator and converter as recited in claim 8, wherein the center body portion includes the cavity formed therein that is ported at separated outer surfaces and includes fittings in each of said ports for connection to inlet and outlet hoses, respectively, that pass the flow of engine coolant therethrough; and the at least one passage is a pair of passages that are formed as grooves across a face of said center body portion and, in the assembly of the body, said pair of grooves are covered over by a flexible rubber gasket that is sandwiched between said center portion face and a flat face of the exhaust valve section.

11. The regulator and converted as recited in claim 8, wherein the body means center portion includes the LPG inlet port and the vaporized LPG exhaust port that are formed into opposite sides thereof, and which said LPG inlet port to includes, as the LPG inlet valve means, a valve seat having a tapering surface to receive a tapered surface of a valve body, providing an interference fit therebetween where the slope of the valve body tapered is slightly greater than the slope of the valve seat tapering surface, the valve body is fitted through, to slide up and down in, a bole formed through the exhaust valve section, and means for biasing said valve body away from said valve seat; and including a diaphragm for moving said valve body tapered end into said valve seat, which said diaphragm is maintained across a cavity formed in an outer surface of said exhaust valve section, and includes a pusher portion that is located adjacent to a head end of said valve body, and which said pusher portion is to engage and depress said valve body head end, against said biasing means to urge said valve body sloping surface into said valve seat when the pressure is greater in the area between diaphragm and the valve body head than in the area above said diaphragm.

12. The regulator and converter as recited in claim 11, wherein the slope of the valve body tapered end is at a forty five degree angle, and the slope of the taper of the valve seat that receives said valve body tapered end is at a forty three degree angle.

13. The regulator and converter as recited in claim 8, wherein vaporized LPG is passed into an engine intake air flow through a flap valve means that includes an arm that is pivotally mounted onto the center portion, adjacent to the vaporized LPG exhaust port and includes a valve face for positioning over, to close off, said vaporized LPG exhaust port and spring means are fitted to, so as to act on said arm, urging said valve face into engagement over said vaporized LPG exhaust port, blocking flow of gaseous propane therethrough; and a diaphragm is mounted across said center body portion, above said flap valve means, and beneath an end cap, that includes a stiff metal tab formed with a foot for mounting unto said diaphragm surface and a section that is at a right angle that includes a slot formed therethrough for fitting over an end of said arm whereby, when LPG vapors are directed through said LPG exhaust port, the pressure thereof lifts said flap valve face off of said LPG exhaust port and passes the LPG vapors therethrough, and, when LPG flow is cut off, the spring biasing on said flap valve arm will move said flap valve face into engagement with, to close off, said LPG exhaust port, which said diaphragm flexed with travel of said arm and, responsive to a vacuum at the LPG exhaust port, towards the arm, depressing said arm against the biasing of said spring means.

14. The regulator and converter as recited in claim 8, wherein the LPG cutoff valve includes a remote switch means for operation by art engine operator to enable LPG cutoff valve operation; and at least one low or high vacuum pressure switch that are electrically connected to said LPG cutoff valve are mounted to sense the vacuum as is pulled on closure of an engine throttle, which said low and high pressure switches can each send a shutoff signal to said LPG cutoff valve when, respectively, the lower pressure switch senses a lower than set pressure in water column vacuum, and when the high pressure switch senses a higher than set pressure in inches of water column vacuum, with either of which low and high pressure switches to send a shut off signal to said LPG cutoff valve.

15. The regulator and converter as recited in claim 8, wherein the low pressure switch is set to pass a cutoff signal to the LPG cutoff valve upon sensing of a one point five (0.5) inches of water column vacuum; and the high pressure switch is set to pass a cutoff signal to the cutoff valve upon sensing of thirty (30) inches of water column vacuum.

* * * * *